United States Patent [19]

Hill

[11] 4,057,875
[45] Nov. 15, 1977

[54] FEED APPARATUS FOR POULTRY GIZZARD PROCESSING MACHINE

[76] Inventor: Carl J. Hill, Rte. 3, Box 229, Ball Ground, Ga. 30107

[21] Appl. No.: 738,437

[22] Filed: Nov. 3, 1976

[51] Int. Cl.² .............................................. A22C 17/14
[52] U.S. Cl. ............................................ 17/43; 17/11
[58] Field of Search ..................... 17/1 G, 45, 11, 43

[56] References Cited

U.S. PATENT DOCUMENTS

| | | | |
|---|---|---|---|
| 2,630,599 | 3/1953 | Grant et al. | 17/43 |
| 2,861,293 | 11/1958 | Platt | 17/43 |
| 3,187,376 | 6/1965 | Laws | 17/52 |
| 3,406,425 | 10/1968 | Hill | 17/43 |
| 3,480,991 | 12/1969 | Edwards, Sr. | 17/43 |
| 3,579,714 | 5/1971 | Edwards, Sr. | 17/11 |
| 3,629,902 | 12/1971 | Leonard | 17/11 |
| 3,714,682 | 2/1973 | Harben, Jr. | 17/11 |
| 3,882,571 | 5/1975 | Evers et al. | 17/43 |
| 3,990,128 | 11/1976 | van Mil | 17/43 |

Primary Examiner—Louis G. Mancene
Assistant Examiner—Paul J. Hirsch
Attorney, Agent, or Firm—Darbo & Vandenburgh

[57] ABSTRACT

A pair of rolls extend upstream from beyond the upstream end of a generally horizontal feed trough. The configuration and the rotation of the rolls is such that the gizzard and stomach are supported on the tops of the rolls while the gut and gullet, including the crop, depend below the rolls. The rotation of the rolls moves the stomach and gizzard onto the feed trough. Below the feed trough are a pair of gears rotating about vertical axes with the nip of the gears positioned below a slot in the feed trough. These gears pull the gut and gullet in a downstream direction and as they do so a knife below the gears severs the gut and gullet.

9 Claims, 4 Drawing Figures

U.S. Patent        Nov. 15, 1977        4,057,875
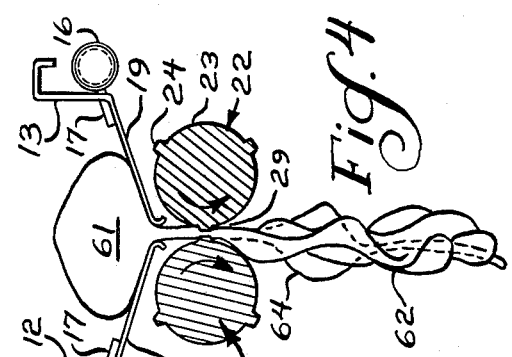
Fig. 4
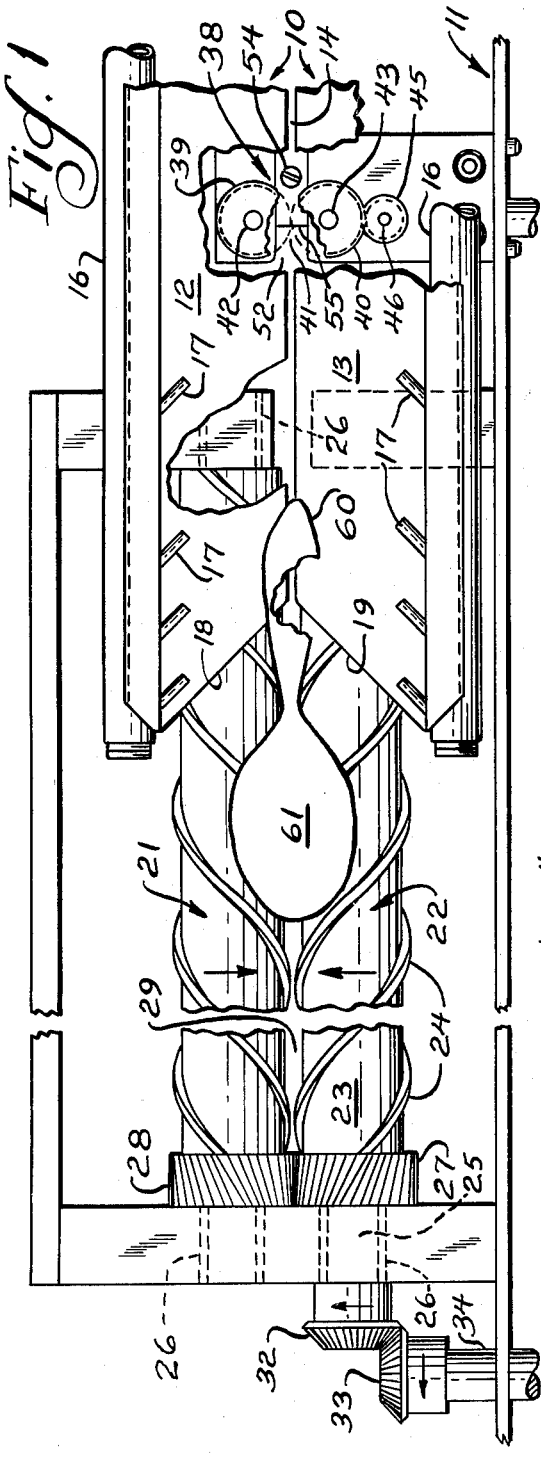
Fig. 1
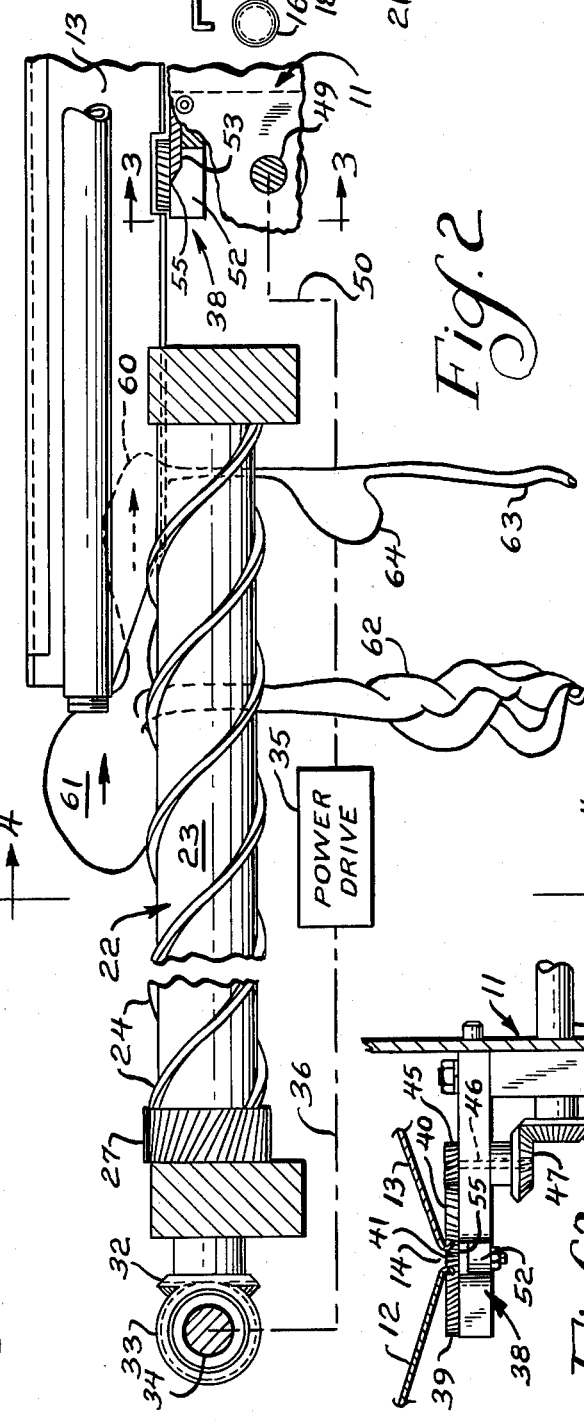
Fig. 2
Fig. 3

4,057,875

FEED APPARATUS FOR POULTRY GIZZARD PROCESSING MACHINE

BACKGROUND AND SUMMARY OF THE INVENTION

Commercially available poultry gizzard processing machines require that the gut and gullet must be manually severed from the gizzard and stomach respectively before the latter are introduced into the processing machine. Obviously, the cost of processing poultry is reduced as a function of the reduction in the amount of manual labor involved. To this end, the principal object of the present invention is to eliminate the manual steps of severing the gut and gullet from the gizzard and stomach before they can be introduced into the gizzard processing machine. Thus, an operator at a given station along a poultry processing line need only sever the gullet and gut from the carcass and drop the assemblage of the gizzard, stomach, gut and gullet, including the crop, onto the machine. Thereupon the machine takes over to remove the gullet and gut and to introduce the remaining stomach and gizzard into the gizzard processing machine per se.

The invention comprises a pair of rolls which introduce the stomach and gizzard onto the feed trough of a gizzard processing machine with the gut and gullet dangling therefrom through the slot in the feed trough. As the stomach and gizzard move along the feed trough toward the gizzard processing machine, the gut and gullet are engaged at the nip of a pair of gears rotating about vertical axes. As they pass through that nip a knife immediately to one side of the gears severs the gut and gullet.

DESCRIPTION OF THE DRAWINGS

FIG. 1 is a plan view of an embodiment of the invention;

FIG. 2 is an elevational view;

FIG. 3 is a partial section as viewed at line 3—3 of FIG. 2; and

FIG. 4 is a section as viewed at line 4—4 of FIG. 2.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

It is intended that the present invention be incorporated as a part of a form of existing poultry processing machines, as for example the machine which is in part illustrated and described in my prior U.S. Pat. No. 3,411,828. The feed trough or chute, generally 10, shown herein, is a part of the gizzard processing machine and would correspond to the "chute" 24 of that patent. It is suitably supported from the frame 11 of the gizzard processing machine. The trough includes a pair of side plates 12 and 13 which are spaced apart to define an opening 14 therebetween, which opening extends longitudinally of the trough. Transversely, the plates slope downwardly towards the opening, as best seen in FIGS. 3 and 4. In some embodiments the plates, and thus the trough, also slope downwardly in the downstream directly, i.e., to the right in FIGS. 1 and 2.

Along each side of the trough are water supply pipes 16. Projecting from these pipes are a plurality of nozzles 7, only a few of which are illustrated in the drawings. These nozzles face downstream of the trough at about a 45° angle. Thus, the water emitted therefrom serves to move the gizzard and stomach along the trough in the downstream direction, in addition to flushing the exterior of the gizzard and stomach.

The upstream ends 18 and 19 of the plates 12 and 13 are slanted so that the upstream end of the trough is in the form of a V having its apex at the opening 14. A pair of rolls, generally 21 and 22, extend in the upstream direction from the trough, with part of the rolls being below the upstream end of the trough. Roll 22 has a cylindrical surface 23. About this surface are a plurality (two in the illustrated embodiment) helical ribs 24. The roll has a shaft 25 extending from each end. The shafts are suitably journaled in bearings 26 mounted in frame 11.

A gear 27 secured to the shaft of roll 22 meshes with a gear 28 of roll 21 so that the rolls rotate in unison. Roll 21 is identical to roll 22, as just described, except that the helical rotation of the ribs about the cylindrical surface is reversed. The cylindrical surfaces of the two rolls are spaced apart to define a slot 29 therebetween. As illustrated, the ribs of the two rolls reach slot 29 in unison as the rolls are rotated.

A bevel gear 32 is secured to shaft 25. It meshes with a bevel gear 33 on shaft 34. Shaft 34 is suitably connected to the power drive 35 of the poultry gizzard processing machine as indicated by dot-dash line 36.

Below the trough is a device, generally 38, for detaching the gullet and gut from the stomach and gizzard respectively. This device includes a pair of gears 39 and 40 which mesh to define a nip 41. The nip is aligned immediately below opening 14 in the feed trough. The gears are secured to shafts 42 and 43 which are suitably journaled in frame 11 to rotate about approximately vertical axes. Gear 40 meshes with a drive pinion 45 secured to a shaft 46. A bevel gear 47 also is secured to shaft 46 and meshes with a bevel gear 48. Bevel gear 48 is attached to a drive shaft 49 which is suitably connected to power drive 35, as indicated by dot-dash line 50. The arrangement is such that gears 39 and 40 are rotated such that at the nip 41 they are moving in the downstream direction of the feed trough.

Immediately at the bottom side of the trough opening 14 and the gears, the frame 11 has an opening 52. Positioned in this opening, and immediately at the bottom side of the gears, is a knife 53 held in place by a screw 54 threaded into the frame. The upstream end of this knife is beveled to form a cutting edge 55 which is positioned at the bottom face of the gears 39, 40 at the nip. In some embodiments the cutting edge 55 may be positioned at the upper side or face of the gears rather than at the bottom side as in the illustrated embodiment.

In use, the left end of the illustrated embodiment would be placed at a location practically under the line of poultry carcasses moving along an overhead conveyor. After the carcasses were opened, the gizzard and stomach would be suspended therefrom by the gut and gullet. At that point, an operator standing at this machine would sever the gut and gullet at about the points of their attachment to the remainder of the carcass, thus releasing the assemblage of the stomach and gizzard, with at least a major part of the gullet and gut attached thereto. The operator would then drop this assemblage onto rolls 21, 22, preferably with the stomach 60 downstream from the gizzard 61. It is not necessary for that operator to be further concerned as to the location of the gut (intestine) 62 or the gullet (esophagus) 63 on the roll. The rotation of the rolls, with the tops thereof moving toward each other, will draw the gut and gullet towards slot 29 between the rolls. This slot is sufficiently wide to permit the gut and gullet, including the crop 64, to descend through slot 29 to the position illustrated in FIGS. 3 and 4. However, the gizzard and stomach, because of their size, will continue to ride on the upper surfaces of the rolls. In addition to drawing the gut and gullet through the slot, the rotation of the rolls moves the stomach and gizzard downstream toward and onto chute 10, i.e., a movement to the right in FIGS. 1 and 2.

After the stomach and gizzard have moved fully onto the chute 10, their movement down the chute is continued by reason of the water jets issuing from nozzles 17. In part, that initial movement may be assisted by continued contact of the ribs 24 with the portions of the gut and gullet that are still within slot 29. As the gullet 63 enters opening 52 and between gears 39 and 40 it is drawn by those gears into the pinch-point. As it passes the pinch-point it contacts the knife edge 55 which slices off the gullet close to the stomach 60. A corresponding cutting of the gut 62 occurs as it is drawn through the pinch-point between gears 39 and 40. The stomach and gizzard at this stage are free to continue on along trough 10 and are properly aligned for entrance into a processing machine of the type referred to.

I claim:

1. In an apparatus for processing poultry gizzards comprising in combination a power drive, a longitudinal feed trough having an upstream end and a downstream end and along which said gizzards are moved longitudinally thereof in an established direction toward the downstream end, said trough having a longitudinal opening of a width sufficient to permit the gut and gullet of the gizzard to pass therethrough while sufficiently narrow to prevent the gizzard and the stomach attached thereto from descending therethrough so that they will remain on the trough, and a device below the trough opening and between said ends for removing the gullet and the gut from the stomach and gizzard, the improvement wherein said device comprises:

a pair of gears rotatable about substantial vertical axes and having top sides and bottom sides, said gears interengaging each other and defining a nip therebetween, said nip being positioned below said opening, one of said gears being connected to said power drive to rotate the gears in a direction such that at the nip the gears are moving in said established direction, whereby the gut and gullet will be engaged by the gears at said nip and pulled thereby in said established direction; and knife means immediately adjacent one of said sides at about said nip and having a cutting edge facing in the reverse of said established direction for severing the gut and gullet as they are so engaged and pulled.

2. In an apparatus as set forth in claim 1, wherein the knife means is immediately below the bottom sides of the gears.

3. In an apparatus as set forth in claim 2, wherein said knife means comprises a fixed knife.

4. In an apparatus as set forth in claim 1, wherein said knife means comprises a fixed knife.

5. In an apparatus as set forth in claim 1, wherein the combination includes a feeding device for positioning said stomach and gizzard on said trough with the gut and gullet, including the crop, dangling below the trough, said feeding device comprising a pair of side by side rolls rotatable about generally parallel axes substantially aligned with said trough and extending a predetermined distance in the opposite direction of said established direction in front of and below the upstream end of the trough, said rolls having helical ridges thereabout with the helical ridges of one roll being the reverse of the helical ridges of the other roll, and means connecting the rolls to the power drive for rotating the rolls in a direction such that a gizzard resting on the top of the rolls is moved toward and onto the upstream end of the trough.

6. In an apparatus as set forth in claim 5, wherein said rolls have cylindrical surfaces from which said ridges project, said surfaces being spaced apart to define a slot therebetween which slot is sufficiently wide to permit the gut and gullet, including the crop, to pass downwardly therebetween and sufficiently narrow such that the gizzard and stomach will remain supported on the rolls, said rolls being rotated in a direction such that the tops thereof are moving toward each other.

7. In an apparatus for processing poultry gizzards comprising in combination a power drive, a longitudinal feed trough having an upstream end and a downstream end and along which said gizzards are moved longitudinally thereof in an established direction toward the downstream end, said trough having a longitudinal opening of a width sufficient to permit the gut and gullet of the gizzard to pass therethrough while sufficiently narrow to prevent the gizzard and the stomach attached thereto from descending therethrough so that they will remain on the trough, a feeding device for positioning said stomach and gizzard on said trough with the gut and gullet, including the crop, dangling below the trough, said feeding device comprising a pair of side by side rolls rotatable about generally parallel axes substantially aligned with the longitudinal direction of said trough, and extending a predetermined distance in the opposite direction of said established direction in front of and below the upstream end of the trough, said rolls having helical ridges thereabout with the helical ridges of one roll being the reverse of the helical ridges of the other roll, and means connecting the rolls to the power drive for rotating the rolls in a direction such that a gizzard resting on the top of the rolls is moved toward and onto the upstream end of the trough.

8. In an apparatus as set forth in claim 7, wherein said rolls have cylindrical surfaces from which said ridges project, said surfaces being spaced apart to define a slot therebetween which slot is sufficiently wide to permit the gut and gullet, including the crop, to pass downwardly therebetween and sufficiently narrow such that the gizzard and stomach will remain supported on the rolls, said slot being in a vertical plane substantially corresponding to an extension of a vertical plane through said opening, said rolls being rotated in a direction such that the tops thereof are moving toward each other.

9. In an apparatus as set forth in claim 8, wherein the trough has portions each side of said opening which portions slope downwardly, transversely of the trough, toward said opening, the upstream ends of said portions being beveled so that the upstream end of the trough is substantially in the form of a V having its apex at the opening and pointing in the downstream direction.

* * * * *